(12) United States Patent
Skurkis et al.

(10) Patent No.: US 10,352,466 B2
(45) Date of Patent: Jul. 16, 2019

(54) PASSIVELY ACTUATED RESETTABLE VALVE

(71) Applicant: GM GLOBAL TECHNOLOGY OPERATIONS LLC, Detroit, MI (US)

(72) Inventors: Richard J Skurkis, Lake Orion, MI (US); Anthony L Smith, Troy, MI (US); Xiujie Gao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 62 days.

(21) Appl. No.: 15/635,745

(22) Filed: Jun. 28, 2017

(65) Prior Publication Data
US 2019/0003608 A1     Jan. 3, 2019

(51) Int. Cl.
*F16K 31/00*     (2006.01)

(52) U.S. Cl.
CPC ................... *F16K 31/002* (2013.01)

(58) Field of Classification Search
CPC ...................................................... F16K 31/002
See application file for complete search history.

(56) References Cited

U.S. PATENT DOCUMENTS

| | | | | |
|---|---|---|---|---|
| 4,570,851 A | * | 2/1986 | Cirillo | G05D 23/024 236/101 R |
| 4,699,171 A | * | 10/1987 | Sugden | F16K 17/0473 137/468 |
| 5,261,597 A | * | 11/1993 | Perlman | G05D 23/1333 236/101 D |
| 5,865,418 A | * | 2/1999 | Nakayama | F16K 31/002 251/11 |
| 6,679,263 B2 | * | 1/2004 | Luchetti | A61M 16/04 128/207.15 |
| 6,840,257 B2 | * | 1/2005 | Dario | F16K 31/002 137/14 |
| 8,109,087 B2 | | 2/2012 | Usoro et al. | |
| 8,661,810 B2 | | 3/2014 | Browne et al. | |
| 2012/0109573 A1 | | 5/2012 | Gao et al. | |
| 2016/0313189 A1 | | 10/2016 | Skurkis et al. | |
| 2016/0314918 A1 | | 10/2016 | Skurkis et al. | |

OTHER PUBLICATIONS

Stoeckel et al., "Use of NiTi Shape Memory Alloys for Thermal Sensor-Actuators," Proc. SPIE San Diego (1991); 7 pages.
B.J. Huang et al., "A fast response heat pump water heater using thermostat made from shape memory alloy," Applied Thermal Engineering 29 (2009); pp. 56-63.

* cited by examiner

*Primary Examiner* — Eric Keasel

(57) ABSTRACT

A valve assembly includes a body having a longitudinal axis and defining a cavity therein. A shuttle valve is arranged within the cavity. The shuttle valve has a first surface and a second, opposing surface. An actuator element is adjacent the first surface of the shuttle valve and configured for translating the shuttle valve along the longitudinal axis between a first position and a second position. The actuator element is formed from a shape memory alloy that is transitionable between a martensite crystallographic phase and an austenite crystallographic phase in response to a thermal activation signal to thereby translate the shuttle valve between the first position and the second position. Furthermore, a resilient member is adjacent the second surface of the shuttle valve. The resilient member is configured to oppose the movement of the shuttle valve moving from the first position to the second position.

14 Claims, 6 Drawing Sheets

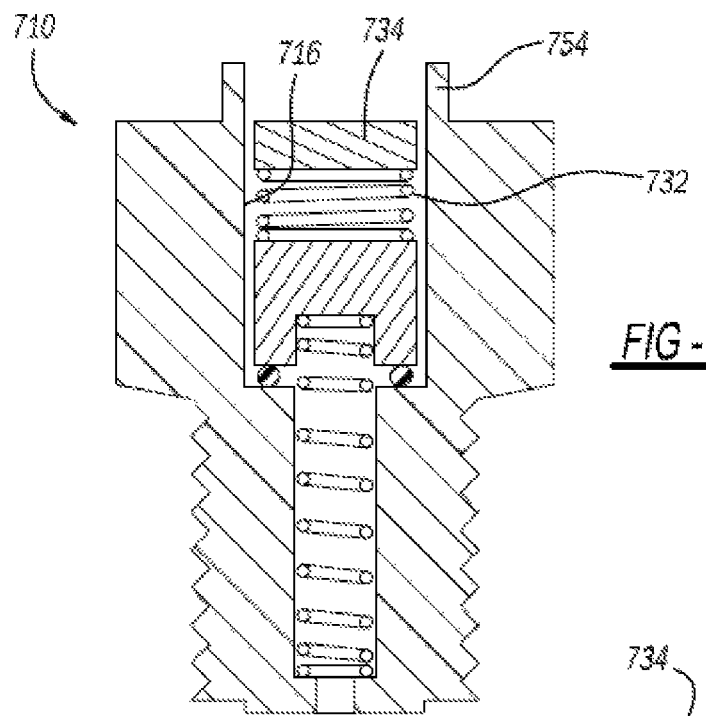
_FIG - 8A_
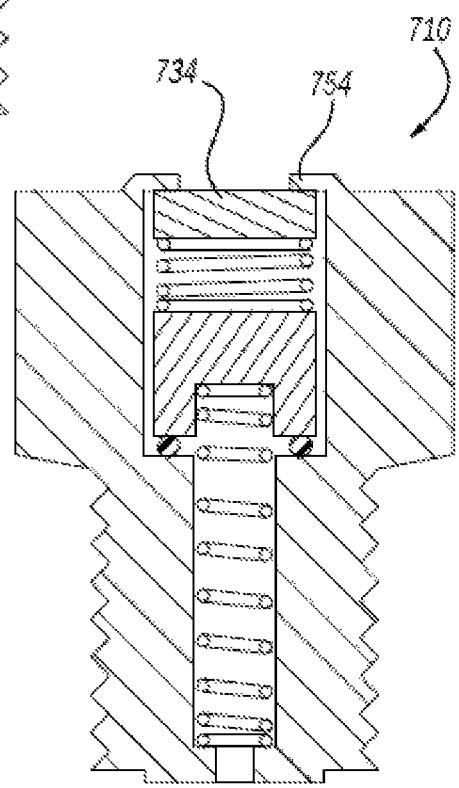
_FIG - 8B_

PASSIVELY ACTUATED RESETTABLE VALVE

FIELD

The present disclosure relates to a passively actuated resettable valve, and more particularly to a passively actuated valve used for temperature sensing.

INTRODUCTION

The statements in this section merely provide background information related to the present disclosure and may not constitute prior art.

Manufacturing equipment, vehicles, and many types of devices are often subject to temperature changes during operation. For example, manufacturing operations may include heating equipment such as ovens, dryers, grinders, and the like that may repeatedly cycle between temperature extremes. Likewise, vehicles such as automobiles, railcars, aircraft, and earth movers may include one or more components, such as gear boxes, brakes, fluid containers, axles, and bearings that may be subjected to varying temperatures during operation. Similarly, electrically-powered equipment, such as electric motors, timer switches, welding transformers, and welding guns; and mechanical equipment such as pulleys, elevators, and augers may be subject to frictional heating during operation. Processing equipment such as reactors, ovens, coolant pipes, conduits, valves, and conveyors may likewise operate in varying environmental and thermal conditions.

Such equipment, vehicles, and devices may be expected to operate with minimal operator attention or oversight. For example, devices may be shrouded by shields or casings during operation, and equipment may be located where physical and/or visual access is limited.

SUMMARY

A valve assembly includes a body having a longitudinal axis and defining a cavity therein. A shuttle valve is arranged within the cavity. The shuttle valve has a first surface and a second, opposing surface. An actuator element is adjacent the first surface of the shuttle valve and configured for translating the shuttle valve along the longitudinal axis between a first position and a second position. The actuator element is formed from a shape memory alloy that is transitionable between a martensite crystallographic phase and an austenite crystallographic phase in response to a thermal activation signal to thereby translate the shuttle valve between the first position and the second position. Furthermore, a resilient member is adjacent the second surface of the shuttle valve. The resilient member is configured to oppose the movement of the shuttle valve moving from the first position to the second position.

In some embodiments, the valve assembly further comprises a plug adjacent to the resilient member. The plug is secured within the cavity of the body for retaining the resilient member adjacent the shuttle valve. The plug also defines an inlet configured to provide a fluid to the cavity, and the body defines a first outlet configured to expel the fluid from the cavity when the shuttle valve is in the second position. The body may also include at least one second outlet configured to expel the fluid from the cavity when the shuttle valve is in the second position. Furthermore, the shuttle valve may be arranged in the first position for sealing the first outlet against fluid flow. The plug is secured within the cavity through one of a threaded screw, a roll crimp, and an adhesive. The actuator element is one of a coiled spring, a wire, a tape, a band, a continuous loop, and combinations thereof.

Another valve assembly includes a body having a longitudinal axis and defining a cavity therein. The body defines an inlet configured for directing a fluid into the cavity. Furthermore, a shuttle valve is arranged within the cavity, the shuttle valve having a first surface and a second, opposing surface. A resilient member is adjacent the first surface of the shuttle valve. A cap is secured to the body so as to confine the shuttle valve within the cavity of the body. The cap defines an outlet for directing the fluid out of the cavity. Additionally, an actuator element is adjacent the second surface of the shuttle valve. The actuator element is configured for translating the shuttle valve along the longitudinal axis between a first position and a second position, where the first position is configured to seal the outlet against fluid flow.

In some embodiments, the actuator element is formed from a shape memory alloy that is transitionable between a martensite crystallographic phase and an austenite crystallographic phase in response to a thermal activation signal to thereby translate the shuttle valve between the first position and the second position. The resilient member is configured to oppose the movement of the shuttle valve moving from the first position to the second position. Furthermore, the body further includes at least one second outlet configured to expel the fluid from the cavity when the shuttle valve is in the second position. Additionally, the cap is secured to the body through one of a threaded screw, a roll crimp, and an adhesive. The actuator element is one of a coiled spring, a wire, a tape, a band, a continuous loop, and combinations thereof.

Yet another valve assembly includes a resilient member, a shuttle valve having a first surface confronting the resilient member, and an actuator element confronting a second surface of the shuttle valve. The shuttle valve is configured to translate between first and second positions. The actuator element is transitionable between a first and a second state. When the actuator element is in the first state, the actuator element and the resilient member are in balanced equilibrium with the shuttle valve at the first position. When the actuator element is in the second state, the actuator element compresses the resilient member and translates the shuttle valve to the second position.

In some embodiments, the resilient member, the shuttle valve, and the actuator element are arranged within a cavity of a body, and the body defines an inlet configured for directing a fluid into the cavity. The valve assembly may also include a cap secured to the body so as to confine the shuttle valve within the cavity of the body. The cap may also define an outlet for directing the fluid out of the cavity. The first position is configured to seal the outlet against fluid flow. The actuator element is formed from a shape memory alloy that is transitionable between a martensite crystallographic phase and an austenite crystallographic phase in response to a thermal activation signal to thereby translate the shuttle valve between the first position and the second position. The body also includes at least one second outlet configured to expel the fluid from the cavity when the shuttle valve is in the second position. The cap is secured to the body through one of a threaded screw, a roll crimp, and an adhesive.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 8A is a cross-sectional view of another exemplary resettable valve according to the present disclosure; and FIG. 8B is a cross-sectional view of the resettable valve of FIG. 8A in an assembled state.

DETAILED DESCRIPTION

Figure 1:
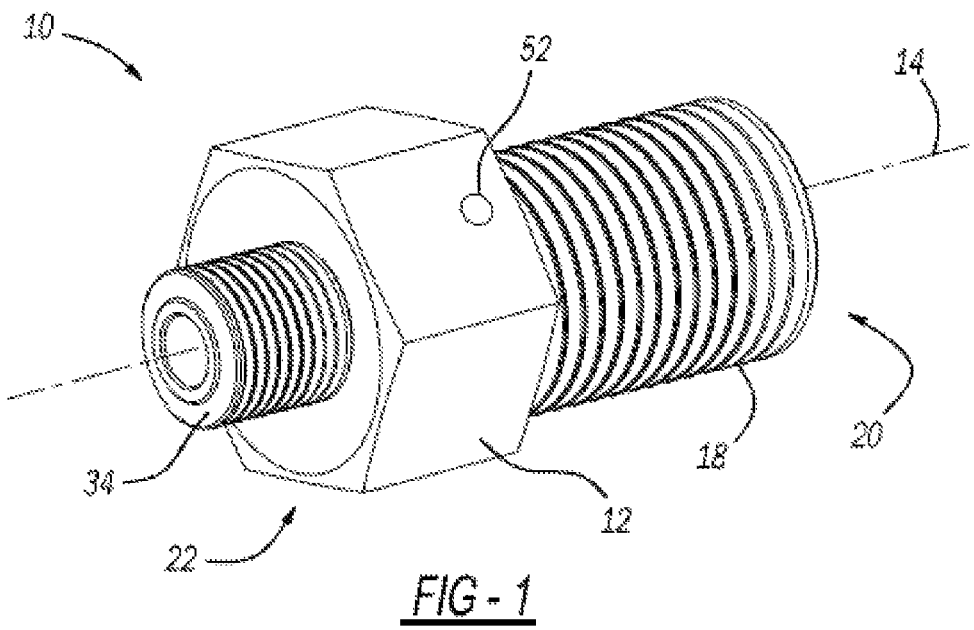
FIG. 1 is a perspective view of an exemplary resettable valve according to the present disclosure.

The following description is merely exemplary in nature and is not intended to limit the present disclosure, application, or uses. It should be understood that throughout the drawings, corresponding reference numerals indicate like or corresponding parts and features. Further, directions such as "top," "side," "back", "lower," and "upper" are used for purposes of explanation and are not intended to require specific orientations unless otherwise stated. These directions are merely provided as a frame of reference with respect to the examples provided, but could be altered in alternate applications.

Figure 2:
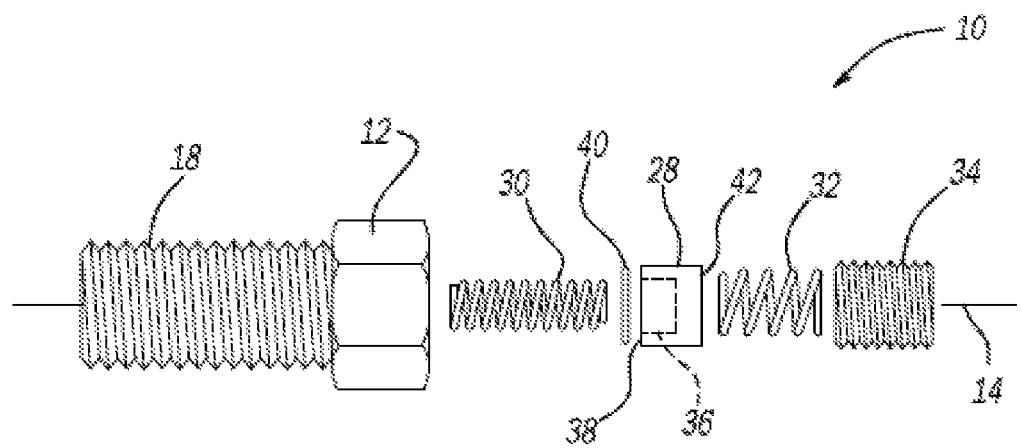
FIG. 2 is an exploded view of the resettable valve of FIG. 1.
Figure 3:
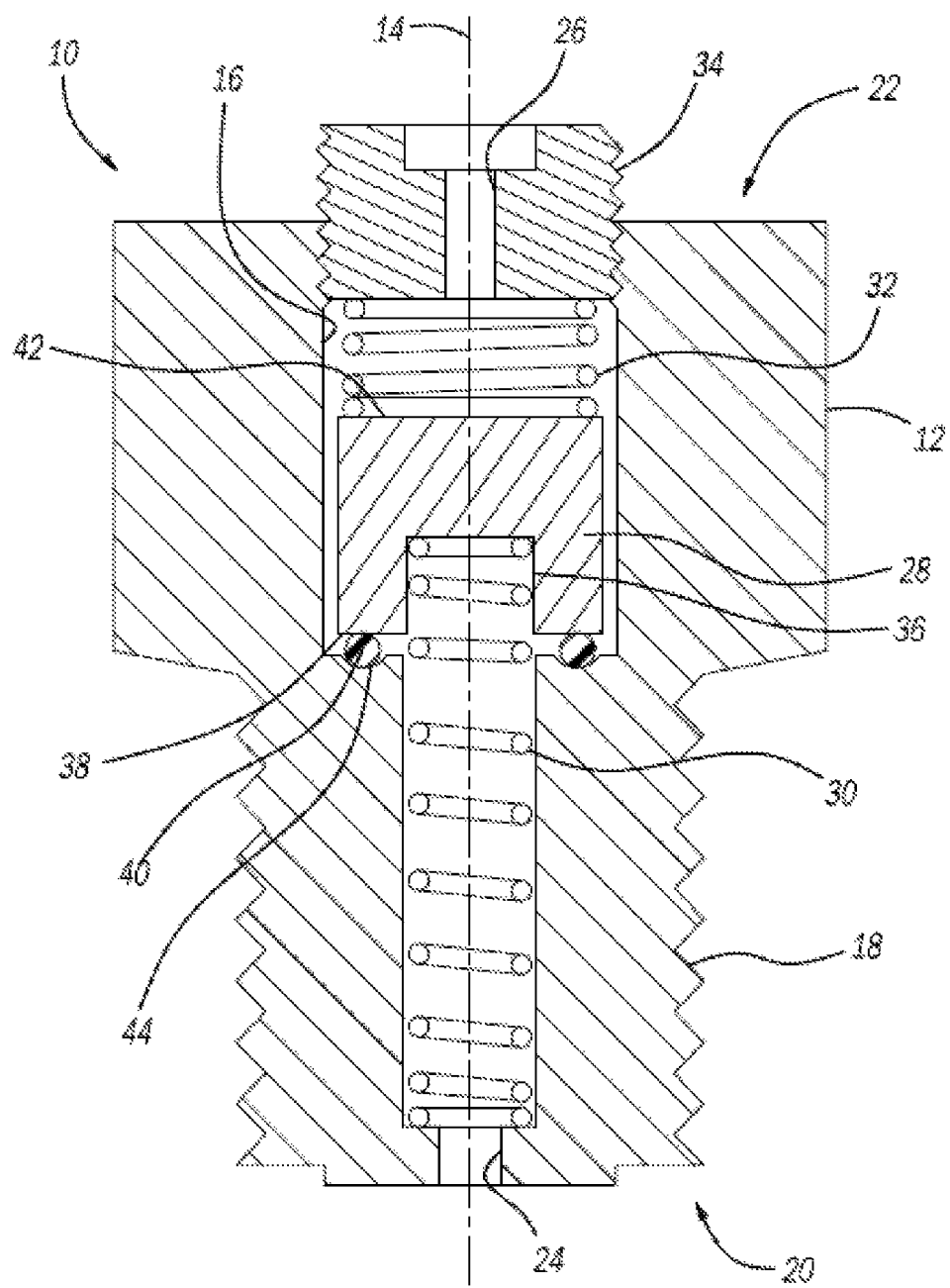
FIG. 3 is a cross-sectional view of the resettable valve of FIG. 1.

Referring now to FIG. 1 through FIG. 3, an exemplary resettable valve assembly 10 is shown. The resettable valve assembly 10 operates passively, i.e., in response to temperature changes and without an additional electrical power source, and is useful for alerting an operator to a condition in which a temperature of a device, a portion of said device, or a fluid falls outside of a desired temperature range. The resettable valve assembly 10 is automatically resettable once the condition has ended, i.e., once the temperature of the device or fluid again returns to within the desired temperature range. Therefore, the resettable valve assembly 10 may be useful for temperature monitoring in the automotive and aerospace manufacturing industries; the pulp and metal processing industries; the agricultural, military, appliance, construction, food and beverage, consumer products and medical service industries; and general manufacturing applications. As an example only, the resettable valve assembly 10 may be useful for vehicle applications such as oil temperature monitoring, coolant temperature monitoring, transmission temperature monitoring, axle fluid temperature monitoring, brake caliper fluid monitoring, and the like. However, the resettable valve assembly 10 may also be useful for non-vehicular temperature monitoring applications such as heating equipment, e.g., ovens, dryers, and grinders, that may repeatedly cycle between temperature extremes; electrically-powered equipment, e.g., electric motors, timer switches, welding transformers, and welding guns, that may be subjected to varying temperatures during operation; mechanical equipment, e.g., pulleys, elevators, and augers that may be subject to frictional heating during operation; and processing equipment, e.g., reactors, ovens, coolant pipes, conduits, valves, and conveyors that may likewise operate in varying environmental and thermal conditions.

The resettable valve assembly 10 includes a body 12 having a longitudinal axis 14. The body 12 defines a cavity 16 therein and includes a first plurality of threads 18 disposed about the longitudinal axis 14. The body 12 may be formed from a thermally-conductive material, such as a metal, e.g., brass or copper, according to the operating conditions of the resettable valve assembly 10. The first plurality of threads 18 may form a screw such that the body 12 may threadably attach to a device (not shown). In one embodiment, the body 12 may have a generally cylindrical shape and may protect other components of the resettable valve assembly 10 from contaminants during operation. The body 12 may have a proximal end 20 and a distal end 22 spaced apart from the proximal end 20 along the longitudinal axis 14. The cavity 16 may be configured for containing a fluid (not shown) such as an oil-based fluid, a coolant, ambient air, and the like. For example, the fluid may be an oil-based transmission fluid. The fluid may enhance or decrease heat transfer to various components of the resettable valve assembly 10. The fluid may enter the body 12 at an inlet 24 and may exit the body 12 at an outlet 26.

The resettable valve assembly 10 may also include a shuttle valve 28 translatable within the cavity 16 along the longitudinal axis 14, an actuator element 30 arranged at the proximal end 20 and configured for translating the shuttle valve 28, and a resilient member 32 arranged at the distal end 22 and in contact with the shuttle valve 28 and with a threaded plug 34. The shuttle valve 28 may have a generally cylindrical shape and may include a blind hole 36 formed at a first end 38 of the valve 28 so as to receive the actuator element 30 therein. During operation, the shuttle valve 28 may slide back and forth within the cavity 16, and may come to rest upon an o-ring seal 40 confronting the first end 38, as will be described in greater detail below.

The actuator element 30 may be configured for translating the shuttle valve 28 along the longitudinal axis 14 between a first position nearer the proximal end 20 in which the shuttle valve 28 contacts the o-ring seal 40, and a second position nearer the distal end 22 in which the shuttle valve 28 is spaced apart from the o-ring seal 40. Notably, any location spaced apart from the o-ring seal 40 is constitutes the "second position." The actuator element 30 is formed from a shape memory alloy that is transitionable between a martensite crystallographic phase and an austenite crystallographic phase in response to a thermal activation signal (see FIG. 4) to thereby translate the shuttle valve 28 between the first position and the second position. The shape memory alloy is transitionable in response to the thermal activation signal between a first temperature-dependent state and a second temperature-dependent state. Therefore, the actuator element 30 may actuate or translate the shuttle valve 28 by transitioning between the first temperature-dependent state and the second temperature-dependent state such that the shuttle valve 28 slides along the longitudinal axis 14 within the cavity 16. Notably, however, the actuator element 30 must overcome the force of the resilient member 32 in order to move the valve 28 from the first position.

As used herein, the terminology "shape memory alloy" refers to alloys that exhibit a shape memory effect and have the capability to quickly change properties in terms of stiffness, spring rate, and/or form stability. That is, the shape memory alloy may undergo a solid state crystallographic phase change via molecular or crystalline rearrangement to shift between the martensite crystallographic phase, i.e., "martensite", and the austenite crystallographic phase, i.e., "austenite". Stated differently, the shape memory alloy may undergo a displacive transformation rather than a diffusional transformation to shift between martensite and austenite. A displacive transformation is defined as a structural change that occurs by the coordinated movement of atoms or groups of atoms relative to neighboring atoms or groups of atoms. In general, the martensite phase refers to the comparatively lower-temperature phase and is often more deformable than the comparatively higher-temperature austenite phase.

Figure 4:
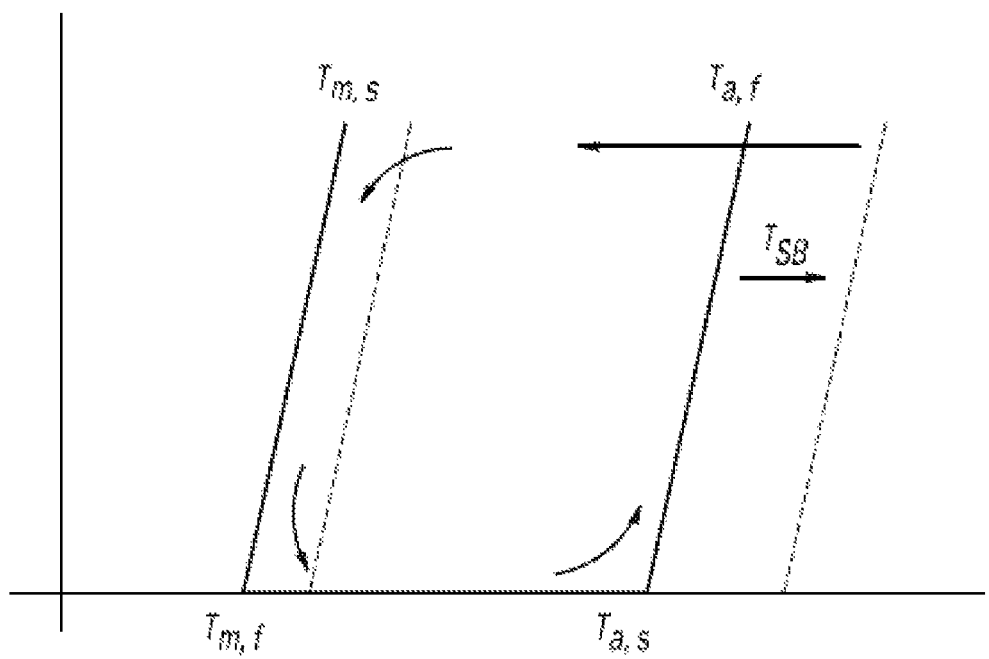
FIG. 4 is a phase transformation diagram for an actuator element according to the present disclosure.

With reference now to FIG. 4, a phase transformation diagram for an actuator element is presented with temperature arranged along the x-axis and valve position arranged along the y-axis. The temperature at which the shape memory alloy begins to change from the austenite crystallographic phase to the martensite crystallographic phase is known as the martensite start temperature ($T_{m,s}$). The temperature at which the shape memory alloy completes the change from the austenite crystallographic phase to the martensite crystallographic phase is known as the martensite finish temperature ($T_{m,f}$). Similarly, as the shape memory alloy is heated, the temperature at which the shape memory alloy begins to change from the martensite crystallographic phase to the austenite crystallographic phase is known as the austenite start temperature ($T_{a,s}$). The temperature at which the shape memory alloy completes the change from the martensite crystallographic phase to the austenite crystallographic phase is known as the austenite finish temperature ($T_{a,f}$).

The shape memory alloy may have any suitable form (i.e., shape). For example, the actuator element 30 is depicted having a coiled spring shape; however, the actuator element 30 may also be configured as a shape-changing element such as a wire, tape, band, continuous loop, and combinations thereof. Further, the shape memory alloy may have any suitable composition. In particular, the shape memory alloy may include, in combination, an element selected from the group of cobalt, nickel, titanium, indium, manganese, iron, palladium, zinc, copper, silver, gold, cadmium, tin, silicon, platinum, aluminum, and gallium. For example, suitable shape memory alloys may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The shape memory alloy can be binary, ternary, or any higher order so long as the shape memory alloy exhibits a shape memory effect, e.g., a change in shape orientation, damping capacity, and the like. Generally, the shape memory alloy may be selected according to desired operating temperatures of the resettable valve assembly 10. In one specific example, the shape memory alloy may include nickel and titanium.

The actuator element 30 formed from the shape memory alloy may be characterized by a cold state, i.e., when a temperature of the shape memory alloy is below the martensite finish temperature ($T_{m,f}$) of the shape memory alloy. Likewise, the actuator element 30 formed from the shape memory alloy may also be characterized by a hot state, i.e., when the temperature of the shape memory alloy is above the austenite finish temperature ($T_{a,f}$) of the shape memory alloy. In addition, although not shown, the resettable valve assembly 10 may include a plurality of actuator elements 30 formed from the shape memory alloy. The number of actuator elements 30 may be selected according to a desired stability of the resettable valve assembly 10 and/or a force required to translate the shuttle valve 28. Further, fluid may be retained within the cavity 16 when the shuttle valve 28 is in the first position contacting the o-ring seal 40 and may modify heat transfer to the actuator element 30, e.g., may increase or amplify the magnitude of the thermal activation signal, such that the actuator element 30 may change shape and/or stiffness more quickly. Conversely, the fluid may decrease the magnitude of the thermal activation signal such that the actuator element 30 may change shape and/or stiffness more slowly or according to a desired schedule.

The actuator element 30 may expand in length in response to the thermal activation signal to translate the shuttle valve 28 along the longitudinal axis 14 as the actuator element 30 transitions from the martensite crystallographic phase to the austenite crystallographic phase. That is, the actuator element 30 may push on the shuttle valve 28 so that the shuttle valve 28 slides along the longitudinal axis 14 towards the distal end 22, thereby overcoming the bias spring force and compressing the resilient member 32 between a second end 42 of the shuttle valve 28 and the plug 34. In this arrangement, the resettable valve assembly 10 is "open" such that fluid flowing in the inlet 24 can flow between the o-ring seal 40 and the shuttle valve 28 towards the outlet 26. As previously noted, any arrangement where the shuttle valve 28 is removed from contact with the o-ring seal 40 is considered to be the "second position" as fluid begins to flow past the o-ring seal 40 at this time. However, when the shuttle valve 28 is moved completely toward the distal end 22, or "fully open" we obtain a maximum flow of the fluid to the outlet 26.

By way of a non-limiting example, for this embodiment, the body 12 may define an annular channel 44 therein. The channel 44 may be configured to receive the o-ring seal 40, such as an o-ring formed from an elastomeric material, and may be generally annular or may have another desired shape or configuration. The channel 44 may assist in maintaining the o-ring seal 40 in a desired location within the cavity 16.

The resettable valve assembly 10 may further include the resilient member 32 disposed in contact with the shuttle valve 28 at the second end 42 of the shuttle valve 28. The resilient member 32 may be a bias spring and may contact a second end 42 of the shuttle valve 28. More specifically, the resilient member 32 may be arranged to translate the shuttle valve 28 along the longitudinal axis 14 in a direction opposite to the direction that the actuator element 30 tends to move the shuttle valve 28 as the actuator element 30 transitions from the martensite crystallographic phase to the austenite crystallographic phase. Therefore, the resilient member 32 opposes the movement of the shuttle valve 28 at a specific spring constant.

Furthermore, as the shape memory alloy cools, the resilient member 32 may push the shuttle valve 28 in the second direction towards the proximal end 20, e.g., away from the plug 34, to thereby reset the resettable valve assembly 10 to an initial or default position where the shuttle valve 28 is seated against the o-ring 40. Therefore, the shape memory alloy may be selected to change shape and/or stiffness at a specific transformation temperature ($T_{SB}$). For example, the transformation temperature ($T_{SB}$) may be selected to correspond to a suitable operating temperature range of the device for which the resettable valve assembly 10 measures or monitors temperature excursions that fall outside, i.e., above or below, a desired operating temperature range. As the actuator element 30 transitions from the austenite crystallographic phase to the martensite crystallographic phase, i.e., as the shape memory alloy cools from a temperature that is greater than the transformation temperature ($T_{SB}$) to a temperature that is lower than the transformation temperature ($T_{SB}$), the actuator element 30 may contract such that the shuttle valve 28 translates along the longitudinal axis 14 towards the proximal end 20.

Conversely, the resettable valve assembly 10 may be arranged in an opposite configuration (e.g., transposing the actuator element 30 and the resilient element 32). In this arrangement, the actuator element 30 may contract and pull against the shuttle valve 28 such that the shuttle valve 28 translates along the longitudinal axis 14 towards the distal end 22. As the shuttle valve 28 translates, the shuttle valve 28 may also expand the resilient member 32 against a spring force. In this regard, the resettable valve assembly 10 is tuned to a particular actuation temperature through alloy formulations and bias force spring rates and behaves in a self-resetting manner.

Figure 5:
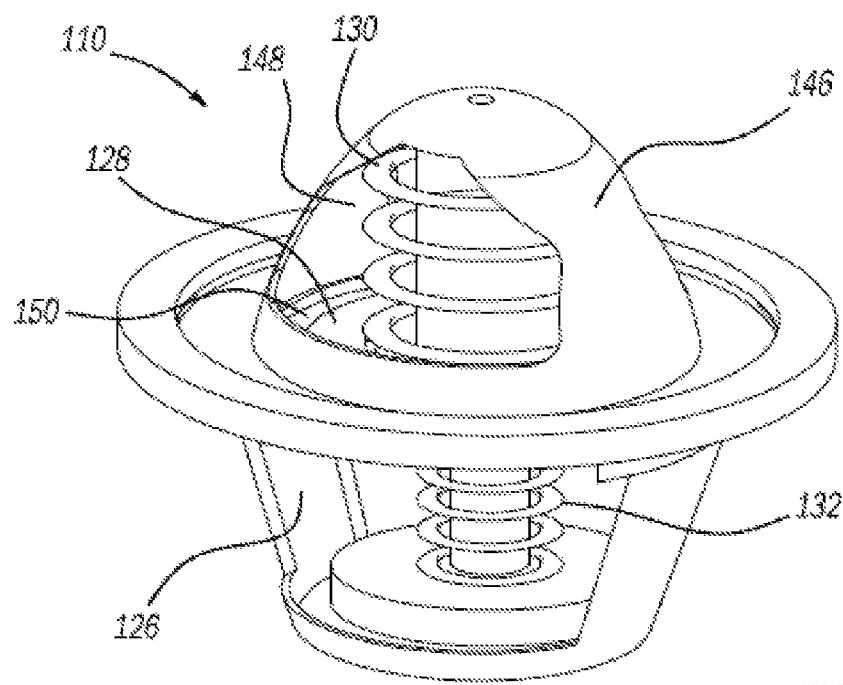
FIG. 5 is a perspective view of another exemplary resettable valve according to the present disclosure.

With reference now to FIG. 5, another exemplary resettable valve assembly 110 includes a shuttle valve 128, an actuator element 130, and a resilient member 132. The resettable valve assembly 110 is substantially similar to the resettable valve assembly 10 and, therefore, will not be described in detail. However, the resettable valve assembly 110 is designed for packaging within a standard automotive thermostat housing (e.g., as in a wax actuator) envelope. In the resettable valve assembly 110, the actuator element 130 is arranged in an upper section 146 having sidewall openings 148, which act as a fluid inlet. Similarly to the resettable valve assembly 10, the actuator element 130 is formed from a shape memory alloy that is transitionable between a martensite crystallographic phase and an austenite crystallographic phase in response to a thermal activation signal to thereby translate the shuttle valve 128 between first and second positions. The shuttle valve 128 is depicted as a plate-shaped element seated against a lower surface 150 of the upper section 146 of the resettable valve assembly 110. The resilient member 132 is arranged to confront the opposing surface of the shuttle valve 128 and apply a force thereto.

In this way, as the temperature of the fluid falls outside of a desired range, the actuator element 130 begins to elongate and overcome the force of the resilient member 132 working on the shuttle valve 128. The shuttle valve 128 begins to move to the second position, away from the lower surface 150 of the upper section 146, and allow fluid to flow thereby. When the temperature of the fluid returns to within the predefined range, the actuator element 130 contracts such that the shuttle valve 128 translates back to the first position (e.g., towards the upper section 146 so as to seat against the lower surface 150).

Figure 6:
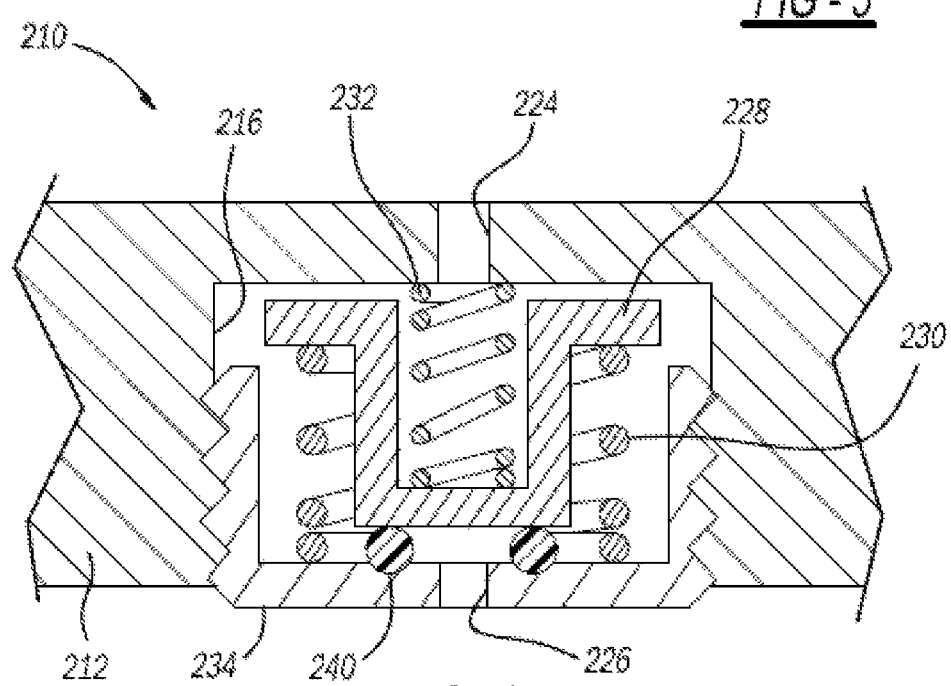
FIG. 6 is a cross-sectional view of another exemplary resettable valve according to the present disclosure.

Referring now to FIG. 6, yet another exemplary resettable valve assembly 210 is depicted having a shuttle valve 228, an actuator element 230, and a resilient member 232. The resettable valve assembly 210 is substantially similar to the resettable valve assembly 10, and therefore, will not be described in detail. However, the resettable valve assembly 210 is designed to have a more compact overall structure, as the actuator element 230 is arranged concentrically with the resilient member 232. Similarly to the resettable valve assembly 10, the resettable valve assembly 210 also includes an inlet 224 for allowing a fluid to enter the cavity 216. The valve assembly 210 mitigates temperature increases during processing by allowing the valve assembly 210 to open when the temperature of the fluid from the inlet 224 exceeds a threshold. In particular, the actuator element 230 is formed from a shape memory alloy that is transitionable between a martensite crystallographic phase and an austenite crystallographic phase in response to a thermal activation signal to thereby translate the shuttle valve 228 between first and second positions. The fluid temperature causes the actuator element 230 to elongate and overcome the opposing force of the resilient member 232. This elongation causes the shuttle valve 228 to move from the first position in which the shuttle valve 228 contacts an o-ring seal 240 to the second position in which the shuttle valve 228 compresses the resilient member 232 and is spaced apart from the o-ring seal 240.

The shuttle valve 228 is depicted as a cup-shaped element arranged within a threaded cap 234 secured to a body 212 of the resettable valve assembly 210. The o-ring seal 240 is arranged between the shuttle valve 228 and the threaded cap 234 such that movement of the shuttle valve 228 to the second position allows the fluid to flow past the o-ring seal 240 to an outlet 226 arranged centrally through the threaded cap 234.

In this way, as the temperature of the fluid increases outside of a desired range, the actuator element 230 begins to elongate and overcome the force of the resilient member 232 working on the shuttle valve 228. The shuttle valve 228 begins to move to the second position, away from the o-ring seal 240, and allow fluid to flow thereby. When the temperature of the fluid returns to within the predefined range, the actuator element 230 contracts such that the shuttle valve 228 translates back to the first position (e.g., towards the threaded cap 234 so as to seat against the o-ring seal 240).

Figures 7A, 7B:
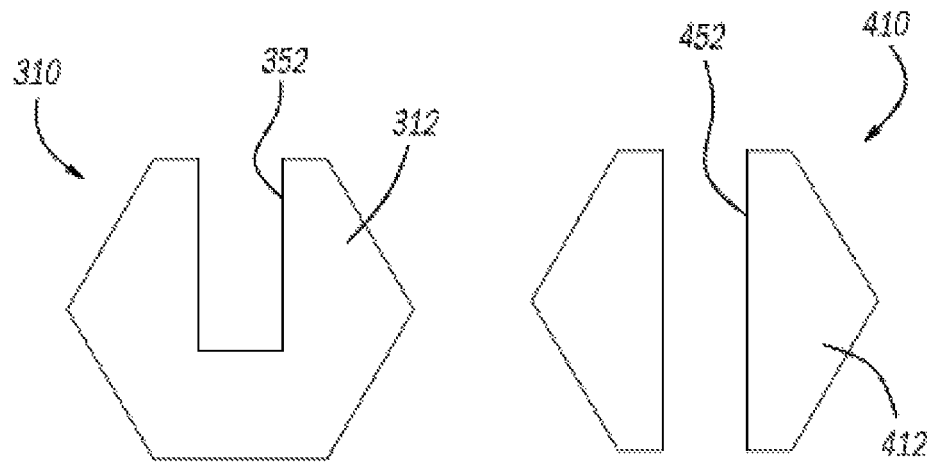
FIG. 7A is a schematic view of an exemplary cross-section of the resettable valve according to the present disclosure.
FIG. 7B is a schematic view of another exemplary cross-section of the resettable valve according to the present disclosure.
Figures 7C, 7D:
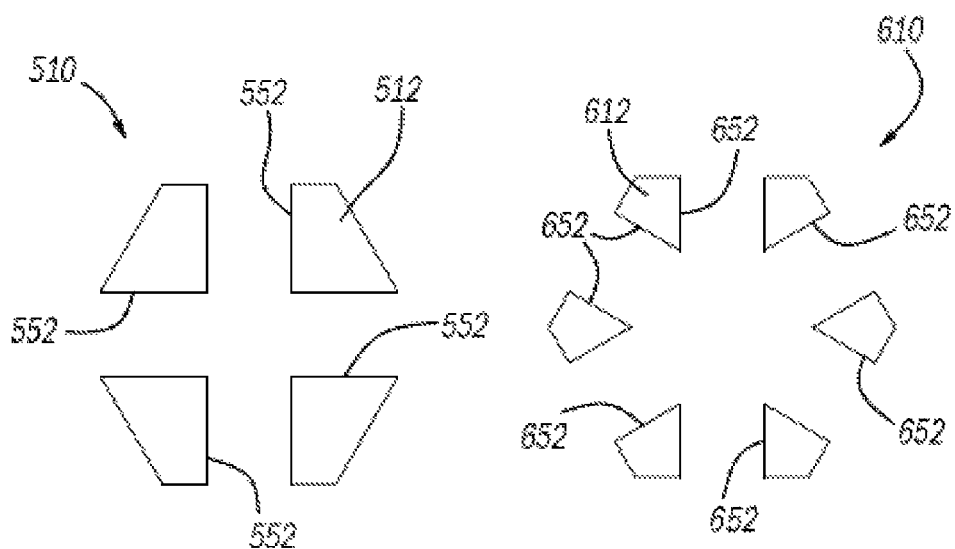
FIG. 7C is a schematic view of another exemplary cross-section of the resettable valve according to the present disclosure.
FIG. 7D is a schematic view of another exemplary cross-section of the resettable valve according to the present disclosure.

With reference now to FIG. 7A, yet another exemplary resettable valve assembly 310 is depicted having a secondary outlet 352 for providing another path (e.g., besides outlets 26, 126, or 226) for fluid to exit the valve assembly 310. The secondary outlet 352 is manufactured as a blind hole extending through one wall of body 312 of the valve assembly 310. An exemplary secondary outlet 52 is depicted in the first embodiment of the resettable valve assembly 10 shown in FIG. 1; however, it should be understood that the secondary outlet 52, 352 may be provided with any of the previous embodiments. Further, while FIG. 7A depicts a single hole through the resettable valve assembly 310, it should be understood that other hole configurations will also result in similar benefits. As an example shown in FIG. 7B, a resettable valve assembly 410 may have a secondary outlet 452 extending completely through body 412 so as to provide two secondary exits for fluid to flow. By providing another path for fluid to exit the valve assembly 410, the system experiences less downstream resistance and a higher flow rate. The resettable valve assembly 410 is also pressure balanced, with less chance for the system to jam. Furthermore, the valve assembly 410 has less thermal mass for faster response. As shown in FIG. 7C, a resettable valve assembly 510 may have a plurality of secondary outlets 552 extending completely through body 512 so as to provide four secondary exits for fluid to flow. As shown in FIG. 7D, a resettable valve assembly 610 may have a plurality of secondary outlets 652 extending completely through body 612 so as to provide six secondary exits for fluid to flow. The embodiments disclosed in FIGS. 7C and 7D serve to further reduce system resistance and thermal mass.

Embodiments of the present disclosure are described herein. This description is merely exemplary in nature and, thus, variations that do not depart from the gist of the disclosure are intended to be within the scope of the disclosure. As an example, while the plug 34 and the cap 234 are described as being threadably attached to the body 12 and body 212, respectively, it should be understood that a non-threaded plug may also be used. As an example, in the resettable valve assembly 710 depicted in FIGS. 8A and 8B, a non-threaded plug 734 is inserted into a cavity 716 and arranged in contact with a resilient member 732. An exterior tab 754 can be roll-crimped over the non-threaded plug 734 in order to hold it in position within the cavity 716 (see FIG. 8B). It is also contemplated to stake the plug in place with adhesive provided on the outer diameter thereof.

The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for various applications. Various combinations and modifications of the features consistent with the teachings of this disclosure, however, could be desired for particular applications or implementations.

What is claimed is:

1. A valve assembly comprising:
   a body having a longitudinal axis and defining a cavity therein;
   a shuttle valve arranged within the cavity, the shuttle valve having a first surface and a second, opposing surface;
   an actuator element adjacent the first surface of the shuttle valve and configured for translating the shuttle valve along the longitudinal axis between a first position and a second position, wherein the actuator element is formed from a shape memory alloy that is transitionable between a martensite crystallographic phase and an austenite crystallographic phase in response to a thermal activation signal to thereby translate the shuttle valve between the first position and the second position;
   a resilient member adjacent the second surface of the shuttle valve, wherein the resilient member is configured to oppose the movement of the shuttle valve moving from the first position to the second position; and
   a plug adjacent to the resilient member, wherein the plug is secured within the cavity of the body for retaining the resilient member adjacent the shuttle valve, and wherein the plug defines an inlet configured to provide a fluid to the cavity, and the body defines a first outlet configured to expel the fluid from the cavity when the shuttle valve is in the second position, and wherein the shuttle valve arranged in the first position seals the first outlet against fluid flow.

2. The valve assembly of claim 1, wherein the body further includes at least one second outlet configured to expel the fluid from the cavity when the shuttle valve is in the second position.

3. The valve assembly of claim 1, wherein the plug is secured within the cavity through one of a threaded screw, a roll crimp, and an adhesive.

4. The valve assembly of claim 1, wherein the actuator element is one of a coiled spring, a wire, a tape, a band, a continuous loop, and combinations thereof.

5. A valve assembly comprising:
   a body having a longitudinal axis and defining a cavity therein, the body defining an inlet configured for directing a fluid into the cavity;
   a shuttle valve arranged within the cavity, the shuttle valve having a first surface and a second, opposing surface;
   a resilient member adjacent the first surface of the shuttle valve;
   a cap secured to the body so as to confine the shuttle valve within the cavity of the body, the cap defining an outlet for directing the fluid out of the cavity; and
   an actuator element adjacent the second surface of the shuttle valve, wherein the actuator element is configured for translating the shuttle valve along the longitudinal axis between a first position and a second position, and wherein the first position is configured to seal the outlet against fluid flow.

6. The valve assembly of claim 5, wherein the actuator element is formed from a shape memory alloy that is transitionable between a martensite crystallographic phase and an austenite crystallographic phase in response to a thermal activation signal to thereby translate the shuttle valve between the first position and the second position.

7. The valve assembly of claim 5, wherein the resilient member is configured to oppose the movement of the shuttle valve moving from the first position to the second position.

8. The valve assembly of claim 5, wherein the body further includes at least one second outlet configured to expel the fluid from the cavity when the shuttle valve is in the second position.

9. The valve assembly of claim 5, wherein the cap is secured to the body through one of a threaded screw, a roll crimp, and an adhesive.

10. The valve assembly of claim 5, wherein the actuator element is one of a coiled spring, a wire, a tape, a band, a continuous loop, and combinations thereof.

11. A valve assembly comprising:
   a resilient member;
   a shuttle valve having a first surface confronting the resilient member, the shuttle valve configured to translate between first and second positions;
   an actuator element confronting a second surface of the shuttle valve, the actuator element transitionable between a first and a second state, wherein when the actuator element is in the first state, the actuator element and the resilient member are in balanced equilibrium with the shuttle valve at the first position, and wherein when the actuator element is in the second state, the actuator element compresses the resilient member and translates the shuttle valve to the second position, and wherein the resilient member, the shuttle valve, and the actuator element are arranged within a cavity of a body, and wherein the body defines an inlet configured for directing a fluid into the cavity; and a cap secured to the body so as to confine the shuttle valve within the cavity of the body, the cap defining an outlet for directing the fluid out of the cavity, and wherein the first position is configured to seal the outlet against fluid flow.

12. The valve assembly of claim 11, wherein the actuator element is formed from a shape memory alloy that is transitionable between a martensite crystallographic phase and an austenite crystallographic phase in response to a thermal activation signal to thereby translate the shuttle valve between the first position and the second position.

13. The valve assembly of claim 11, wherein the body further includes at least one second outlet configured to expel the fluid from the cavity when the shuttle valve is in the second position.

14. The valve assembly of claim 11, wherein the cap is secured to the body through one of a threaded screw, a roll crimp, and an adhesive.

\* \* \* \* \*